United States Patent [19]
Hawkins

[11] 4,158,162
[45] Jun. 12, 1979

[54] TIME-PROPORTIONING CONTROL SYSTEM FOR EARTH-WORKING MACHINES

[75] Inventor: Royal R. Hawkins, Bloomington, Minn.

[73] Assignee: Honeywell Inc., Minneapolis, Minn.

[21] Appl. No.: 807,771

[22] Filed: Jun. 20, 1977

[51] Int. Cl.² ............................................. G05D 1/00
[52] U.S. Cl. .................................. 318/587; 318/599; 318/681; 361/191; 330/1 A
[58] Field of Search ............... 318/587, 681, 599, 596; 361/190, 191; 330/1 A, 11 D

[56] References Cited
U.S. PATENT DOCUMENTS

| | | | |
|---|---|---|---|
| 3,437,826 | 4/1969 | Kelley | 318/681 X |
| 3,471,759 | 10/1969 | Broverman | 318/599 |
| 3,686,557 | 8/1972 | Futamura | 318/681 X |
| 3,702,149 | 11/1972 | Thompson | 318/681 X |
| 4,028,604 | 6/1977 | Togo | 318/596 |

*Primary Examiner*—B. Dobeck
*Attorney, Agent, or Firm*—Trevor B. Joike

[57] ABSTRACT

A time-proportioning control system is disclosed for controlling an on-off solenoid valve of an earth-working machine, the system having a sensor responsive to an external reference for producing an error signal, an amplifier switch for switching on and off the on-off solenoid valve in response to the error signal and a capacitive feedback circuit connected from the output to the input of the amplifier switch for controlling the on and off times of the solenoid valve dependent upon the magnitude of the error signal.

13 Claims, 4 Drawing Figures

TIME-PROPORTIONING CONTROL SYSTEM FOR EARTH-WORKING MACHINES

BACKGROUND OF THE INVENTION

This invention relates to a control arrangement for earth-working machines and, more particularly, to time-proportioning control arrangements for controlling the machine in grade, slope, and/or the like axes.

Earth-working machines, such as graders, pavers and curb and gutter machines, typically have either servo valves or solenoid valves for controlling the operation of the hydraulic motors or cylinders performing various functions on the machines. For example, these valves may control the hydraulic rams for positioning the cutting blade, screed or slip-form of these machines in grade and/or slope axes, or these valves may control the steering of the machine.

Solenoid and servo valves are used in distinctly different types of control systems. Servo valves, a generally more expensive device, is a proportioning valve and is used in proportional control systems. Proportional control systems have the advantage that the hydraulic ram, which is driving a grader blade, for example, is driven at a high speed for large error signals and at a decreasing speed for decreasing error signals. The higher speeds at large error signals allow for immediate correction of the controlled element whereas the slower speeds for smaller errors signals prevent overshoot and cycling around the control point.

As a substitute for servo valves, solenoid valves have found use because they are generally less expensive than servo valves. Solenoid valves are more compatible to "open center" hydraulic systems than are proportional valves. Open center hydraulic systems are frequently used in mobile equipment to reduce oil heating and use simple, economical hydraulic pumps. Solenoid valves are essentially on-off devices used in on-off or bang-bang control systems. On-off systems are incapable of providing both high positioning speeds and narrow dead bands, i.e., the distance that the sensor must travel between turn on and turn off of the system. Unlike proportional control systems, on-off control systems move the hydraulic rams at a fixed speed. If on-off systems are operated at high speeds and narrow dead bands, the hydraulic ram is moved very fast in response to error signals and tends to be driven through the dead band of the system so that the hydraulic ram must be driven back again in the opposite direction. This operation results in overshoot and cyclical operation around the control point. To prevent overshoot and cyclical operation, it is necessary to operate on-off systems either at low speeds with narrow dead bands which, because of the slow speeds, result in inadequate compensation for error signals or at high positioning speeds with wide dead bands which permit too much error.

SUMMARY OF THE INVENTION

The present invention takes advantage of the inexpensiveness of solenoid valves and the variable positioning speeds of proportional control systems. A sensor is responsive to an external reference for producing an error signal. An amplifier switch is connected to the sensor for receiving the error signal and has an output for supplying an output signal to the solenoid valve of the earth-working machine, the output signal being either on or off dependent upon the magnitude of the error signal. A capacitive feedback circuit is connected from the output to the input of the amplifier switch for time proportioning the output signal, the output signal thereby having cyclical on and off times dependent upon the magnitude of the error signal. In this manner, the on-off solenoid valves are driven in a proportional manner providing an averaged positioning speed proportional to the error signal. The sensor may be a grade sensor in which case the external reference is a stringline, light beam such as that eminating from a laser, or the like. Alternatively, the sensor may be a slope sensor responsive to gravity reference or a steering sensor responsive to a stringline or light beam.

BRIEF DESCRIPTION OF THE DRAWINGS

These and other features and advantages will become apparent from a detailed consideration of the drawings in which.

DETAILED DESCRIPTION

Figure 1:
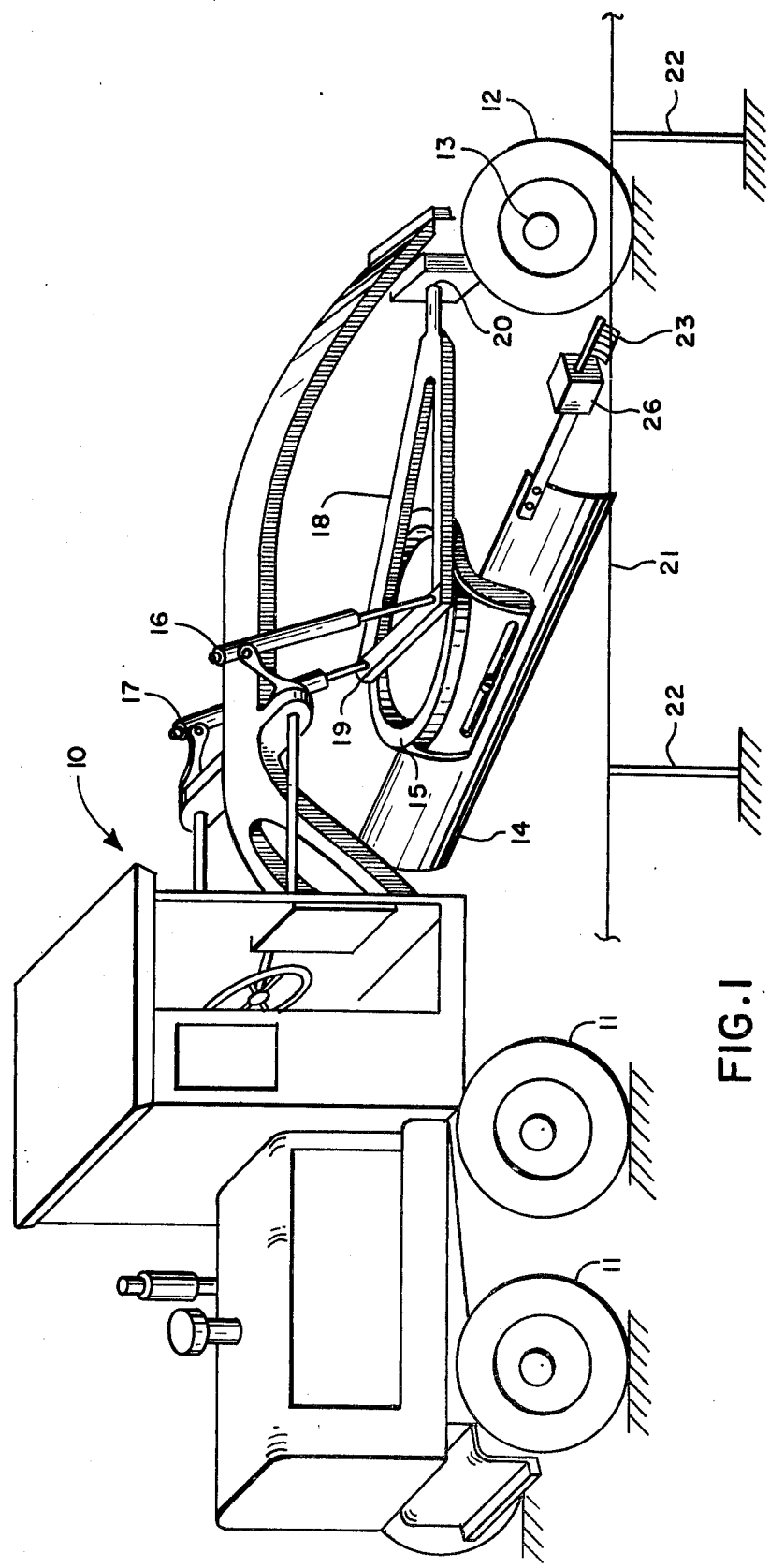
FIG. 1 shows a grader on which the instant invention may be incorporated.

Although this invention may be used on many types of earth-working machines, for purposes of explanation the invention is shown in connection with grader 10 of FIG. 1. Grader 10 is supported at the rear by wheels 11 and at the front by wheel 12 rotating around axle 13. The working tool or instrument of grader 10 is blade 14 supported by blade circle 15. Blade circle 15 is suspended from the frame of machine 10 by A-frame 18 supported at the front end of the machine by a ball-and-socket arrangement 20 and by cross-piece 19 of A-frame 18 suitably attached to hydraulic rams 16 and 17. Blade circle 15 is allowed to rotate around a vertical axis by conventional gears (not shown) connected between cross-piece 19 and blade circle 15.

As mentioned previously, the time-proportioning control arrangement according to the instant invention can be used for grade control, slope control, steering control, or the like. For purposes of describing the time-proportioning control arrangement, it is shown in a grade controlling arrangement. Although the reference for grade control may be a beam of light or any other suitable external reference, the external reference for the grade control shown in FIG. 1 is stringline 21 supported by stakes 22 driven into the ground. A stringline follower or grid 23 rotates as grader blade 14 deviates in a vertical direction from the reference as established by the external reference or stringline 21. Grid 23 is attached to wiper arm 24 of grade sensing potentiometer 25 (shown in FIG. 2) in control box 26. Also located within control box 26 is the time-proportioning control arrangement 30 shown in FIG. 2. Control box 26 is attached to grader blade 14 by any suitable means.

Figure 2:
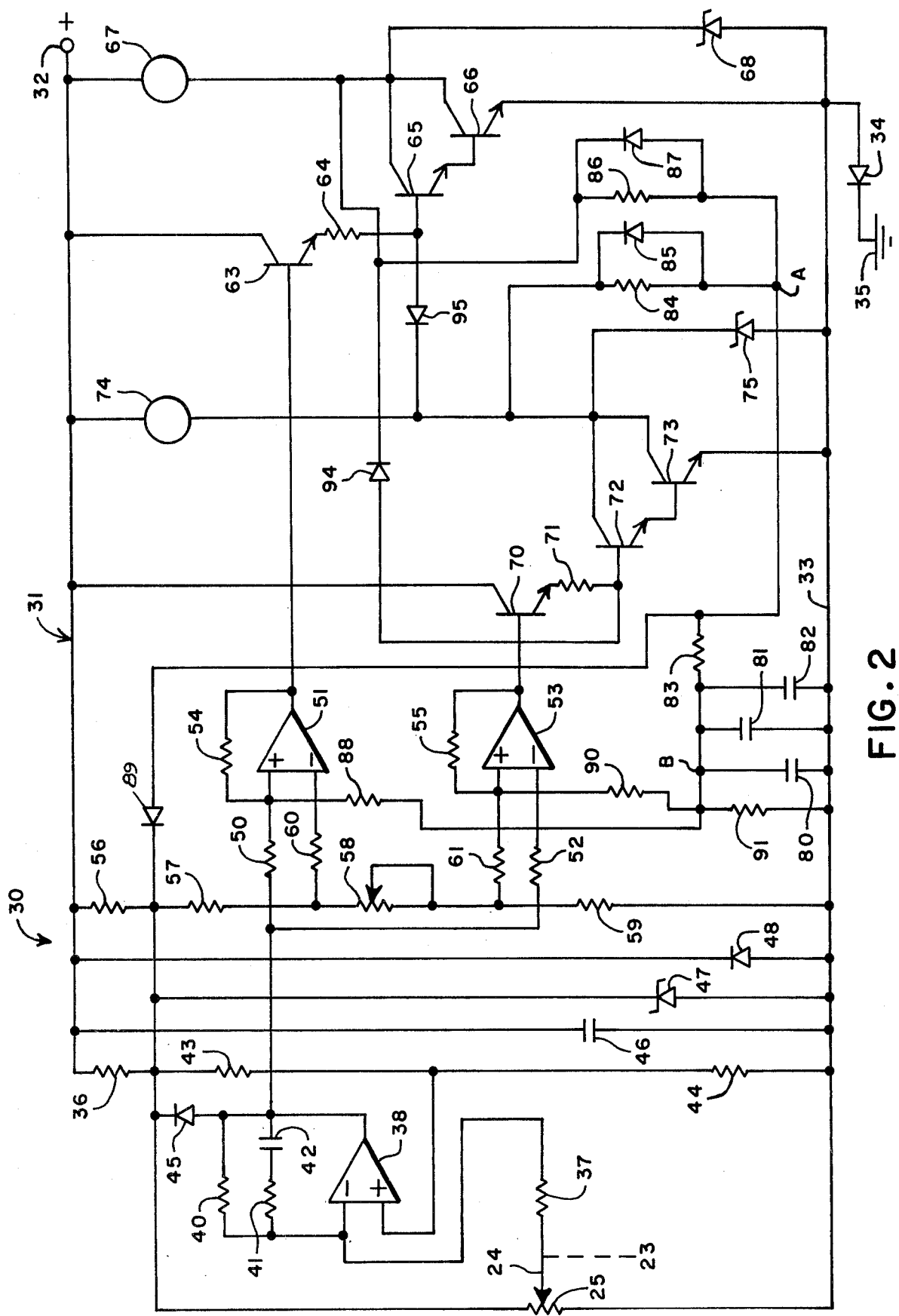
FIG. 2 shows the details of the time-proportioning arrangement according to the instant invention.

In FIG. 2, control arrangement 30 comprises supply line 31 which may be connected to a suitable source such as +12v terminal 32. Supply line 33 is established at a one diode voltage drop above ground by diode 34 connected from line 33 to grounded terminal 35. Potentiometer 25 is connected on one side to line 31 through resistor 36 and is connected on the other side directly to line 33. Wiper arm 24 is connected through resistor 37 to the negative input terminal of operational amplifier 38. Operational amplifier 38 provides a pre-amplification stage for the control arrangement.

The output of amplifier 38 is connected back to its negative input terminal through resistor 40. Connected in parallel with resistor 40 is a series combination of resistor 41 and capacitor 42. A voltage divider is connected between lines 31 and 33 and comprises the series combination of resistor 36, resistor 43 and resistor 44. Diode 45 is connected in a forward direction from the output of amplifier 38 to the regulated junction of resistors 36 and 43. The positive input terminal to amplifier 38 is connected to the junction of resistors 43 and 44. Connected across lines 31 and 33 is the parallel combination of smoothing capacitor 46 and diode 48. Connected from the junction of resistors 36 and 43 to line 33 is a zener diode 47 which establishes a regulated voltage across potentiometer 25 and at the junction of resistors 43 and 44. This diode 47 may be chosen to provide a 6-volt drop across potentiometer 25 so that the null position, or the position of wiper arm 24 with respect to potentiometer 25 where neither hydraulic ram 16 nor hydraulic ram 17 is activated, is chosen so that the output from amplifier 38 is nominally three volts.

The output from amplifier 38 is connected through resistor 50 to the positive input terminal of operational amplifier 51 and is also connected through resistor 52 to the negative input terminal of operational amplifier 53. Operational amplifier 51 has a positive feedback resistor 54 connected from its output to its positive input terminal and operational amplifier 53 has a positive feedback resistor 55 connected from its output to its positive input terminal. Operational amplifiers 51 and 53 are, thus, arranged as Schmidt triggers which will switch between on and off conditions dependent upon the level of reference voltage supplied, in the case of operational amplifier 51, to its negative input terminal, and, in the case of operational amplifier 53, to its positive input terminal. The reference voltages supplied to the negative input terminal of operation amplifier 51 and to the positive input terminal of operational amplifier 53 are derived from a voltage divider comprising series connected resistor 56, resistor 57, potentiometer 58 and resistor 59 connected between lines 31 and 33. The junction of resistors 56 and 57 is connected to the junction of resistors 36 and 43 and thus receives regulated voltage. The junction of resistors 57 and potentiometer 58 is connected through resistor 60 to the negative input terminal of operational amplifier 51. The junction of potentiometer 58 and resistor 59 is connected through resistor 61 to the positive input terminal of amplifier 53.

Potentiometer 58 is arranged as a dead band adjustment which determines the difference in voltage levels at which operational amplifiers 51 and 53 will switch. For example, potentiometer 58 may be adjusted to provide a 3.3 volt input to the negative terminal of amplifier 51 and a 2.7 volt input to the positive terminal of amplifier 53. As long as the output voltage from amplifier 38 is at a voltage between 2.7 volts and 3.3 volts, neither amplifier 51 nor amplifier 53 will switch to its on condition. Thus, the wiper arm 24 is allowed to travel over a predetermined distance of potentiometer 25 before either amplifier 51 or amplifier 53 is switched on.

The output from amplifier 51 is connected to the base terminal of NPN transistor 63 which has its collector connected to line 31 and its emitter connected through resistor 64 to the base of NPN transistor 65. The emitter of transistor 65 is connected to the base of NPN transistor 66 the emitter of which is connected to line 33. The collectors of transistors 65 and 66 are connected together and to one side of a solenoid 67 the other side of which is connected to line 31. Zener diode 68 is connected across the collector-emitter circuit of transistor 66 to protect the Darlington pair 65/66. When operational amplifier 51 switches on, a positive output is provided to turn on transistor 63 which in turn turns on transistors 65 and 66 to ground the lower side of solenoid 67 for the energization thereof.

Similarly, the output of amplifier 53 is connected to the base of NPN transistor 70 the collector of which is connected to line 31 and the emitter of which is connected through resistor 71 to the base of NPN transistor 72. The emitter of transistor 72 is connected to the base of NPN transistor 73 the emitter of which is connected to line 33. The collectors of transistors 72 and 73 are connected together and to one side of solenoid 74 the other side of which is connected to line 31. Zener diode 75 is connected across the collector-emitter circuit of transistor 73 for protection. When amplifier 53 switches on, transistor 70 is turned on to turn on transistors 72 and 73 to energize solenoid 74. Diode 48 is provided to discharge any stored energy in solenoid windings 67 and 74 when the system is turned off.

In the description thus far, the control arrangement 30 operates in a bang-bang or on-off manner. Specifically, when wiper arm 24 has traveled a sufficient distance over potentiometer 25, either operational amplifier 51 or operational amplifier 53 will be turned on to energize the corresponding solenoid windings 67 or 74. As the grader blade is repositioned, the wiper arm 24 begins moving back to its null position. When wiper arm 24 moves sufficiently so that the output voltage from amplifier 58 falls within the dead band, amplifiers 51 or 53, and consequently solenoid 67 or 74, will turn off. Also as pointed out above, on-off systems for controlling solenoid valves have the advantage that solenoid valves are less expensive than servo valves but have the disadvantage that the controlled element, in this case grader blade 14, moves at a fixed positioning speed system, for correcting itself with respect to the external reference. To control a solenoid valve in a proportional manner, a capacitive feedback circuit is provided in the above described system.

This feedback circuit incorporates three parallel connected capacitors 80, 81 and 82 having one side connected to line 33 and the other side connected to point A through resistor 83. Point A is connected to the collectors of transistors 72 and 73 through the parallel combination of resistor 84 and diode 85. Point A is also connected to the collectors of transistors 65 and 66 through the parallel combination of resistor 86 and diode 87 and to the junction of resistors 56 and 57 through the forward junction of diode 89. Thus, feedback capacitors 80, 81 and 82 are connected from each output to operational amplifiers 51 and 53. The junction of capacitors 80, 81 and 82 and resistor 83, point B, is connected to the positive input terminal of operational amplifier 51 through resistor 88 and to the positive input terminal of operational amplifier 53 through resistor 90. Resistor 91 is connected in parallel to the capacitors 80, 81 and 82.

The base of transistors 72 is connected through the forward junction of diode 94 to the collectors of transistors 65 and 66 and the base of transistor 65 is connected through the forward junction of diode 95 to the collectors of transistors 72 and 73. Diodes 94 and 95 allow for manual override of the control circuit without taking the control circuit off of automatic control.

Figure 3:
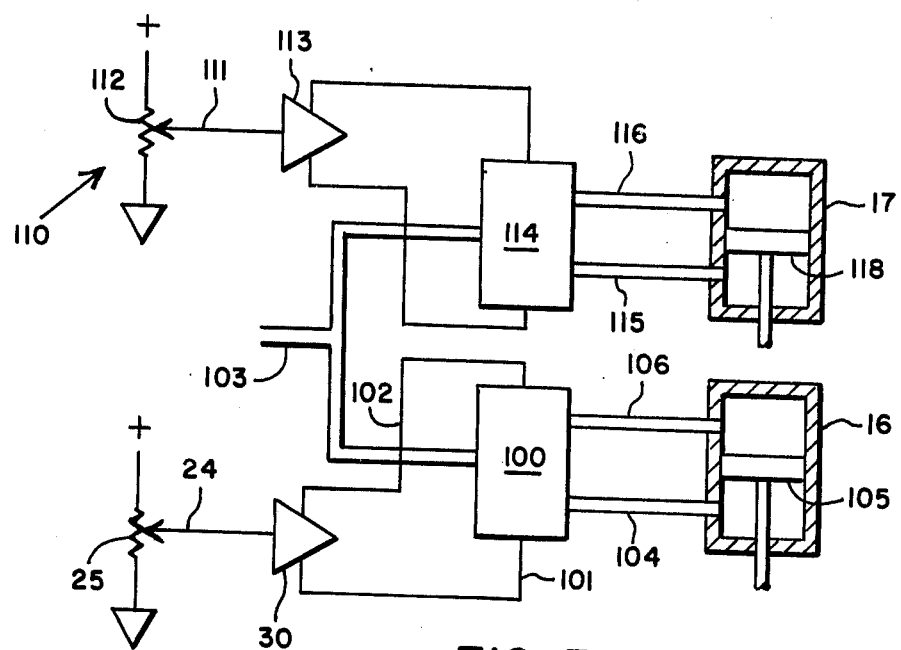
FIG. 3 is a schematic diaphragm showing how the time-proportioning circuit of FIG. 2 can control the hydraulic rams shown in FIG. 1; and, FIG. 4 is a timing diagram showing the corrective action of the time-proportioning circuit.

FIG. 3 shows the manner in which hydraulic rams 16 and 17 may be controlled. The control arrangement 30 is shown with an amplifier symbol having an input connected to wiper arm 24 which cooperates with the resistance element 25 connected between a positive source and a reference potential. This portion of the circuit is the grade control and controls a solenoid valve 100 which may be a Waterman solenoid valve, type number 1618. This valve is a spring centered valve having solenoid windings 67 and 74 therein. Output line 101 represents the output from one of the Darlington pairs shown in FIG. 2 and output line 102 shows the output from the other Darlington pair. When solenoid winding 67 is energized, solenoid valve 100 connects hydraulic fluid from input line 103 to output line 104 for driving piston 105 of hydraulic ram 16 in an upward direction to raise the end of grader blade 14 to which the grade sensing system 26 is attached. Conversely, when solenoid winding 74 is energized, solenoid valve 100 connects input line 103 to output line 106 to hydraulic ram 16 to lower the same end of grader blade 14.

This system may also include a slope sensor 110 which has a wiper arm 111 connected to a weighted pendulum and a resistance portion 112 connected between a positive source and a reference potential. The wiper arm 111 is connected to amplifier 113 which may take the form of control arrangement 30 shown in FIG. 2. The output from amplifier 113 controls a corresponding pair of solenoid windings in solenoid valve 114. Solenoid valve 114 has a corresponding pair of output lines 115 and 116 for controlling the position of piston 118 within hydraulic ram 17. The slope sensor 110 may be mounted on grader 10 as is conventionally known in the art. When the slope sensor 110 senses a change in slope of the blade caused by the grade correction control system 30, it will drive the hydraulic ram 17 in an appropriate direction to maintain a preselected slope angle to the grader 14. Thus, even though the grade control system 26 controls only one hydraulic ram 16, both hydraulic rams 16 and 17 are in effect driven to make corrections in grade.

IN OPERATION

Under quiescent conditions, that is, when the output from amplifier 53 falls within the dead band as established by dead band adjustment 58, neither operational amplifier 51 nor operational amplifier 53 is on so that transistors 70, 72, 73, 63, 65 and 66 are off. The collectors of transistors 65, 66, 72 and 73 are, therefore, essentially at the voltage established on line 31. This voltage is dropped by corresponding resistors 84 and 86 so that point A may be at a voltage less than the voltage on line 31, for example, 6.5 volts. This voltage is again dropped by resistor 83 so that the quiescent voltage of points B is at a lesser voltage, for example 3 volts. This 3 volts falls within the dead band range established by dead band adjustment 58 and has no effect on either amplifier 51 or amplifier 53.

As grid 23 rotates due to variation in the vertical distance of grader blade 14 with respect to the external reference established by stringline 21, wiper arm 24 will move with respect to resistance 25 for varying the output voltage from amplifier 38. When this voltage supplied by amplifier 38 has varied sufficiently to fall outside of the dead band range, in a positive direction for example, amplifier 51 will switch on to turn on corresponding transistors 63, 65 and 66. The potential of collectors of transistors 65 and 66 will be reduced to near the potential on line 33. Thus, the potential at point A drops which also drops the potential at point B as capacitors 80, 81 and 82 begin to discharge through resistor 91 and resistor 83. While amplifier 51 is turned on, solenoid 67 has been energized for adjusting the position of the grader blade 14. As grader blade 14 is adjusted, grid 23 is rotated to drive wiper arm 24 back toward null thus reducing the error voltage output from amplifier 38 back towards the dead band. When the voltage at point B, due to the discharge of capacitors 80-82 has been sufficiently reduced to a level dependent upon the instantaneous magnitude of the error signal, thereby reducing the voltage to the positive input of amplifier 51, amplifier 51 will turn off thus de-energizing transistors 63, 65 and 66. Depending upon the magnitude of the initial error signal supplied by the grade sensing potentiometer 25 and amplifier 38, the output signal from amplifier 38 may or may not have fallen back into the dead band established by dead band adjustment 58.

When transistors 63, 65 and 66 are off, capacitors 80, 81 and 82 begin to recharge. Thus, the voltage to the positive input of amplifier 51 begins to increase. If the error output voltage from amplifier 38 has not fallen back within the dead band as a result of the adjustment of grader blade 14, operational amplifier 51 will turn on when capacitors 80-82 have charged sufficiently which will be determined by the voltage from operational amplifier 38. When amplifier 51 again turns on, transistors 63, 65 and 66 again are turned on to energize solenoid winding 67 to again correct the grader blade 14. This cyclical on-off operation will continue until the output voltage 38 has fallen within the dead band range.

Figure 4:
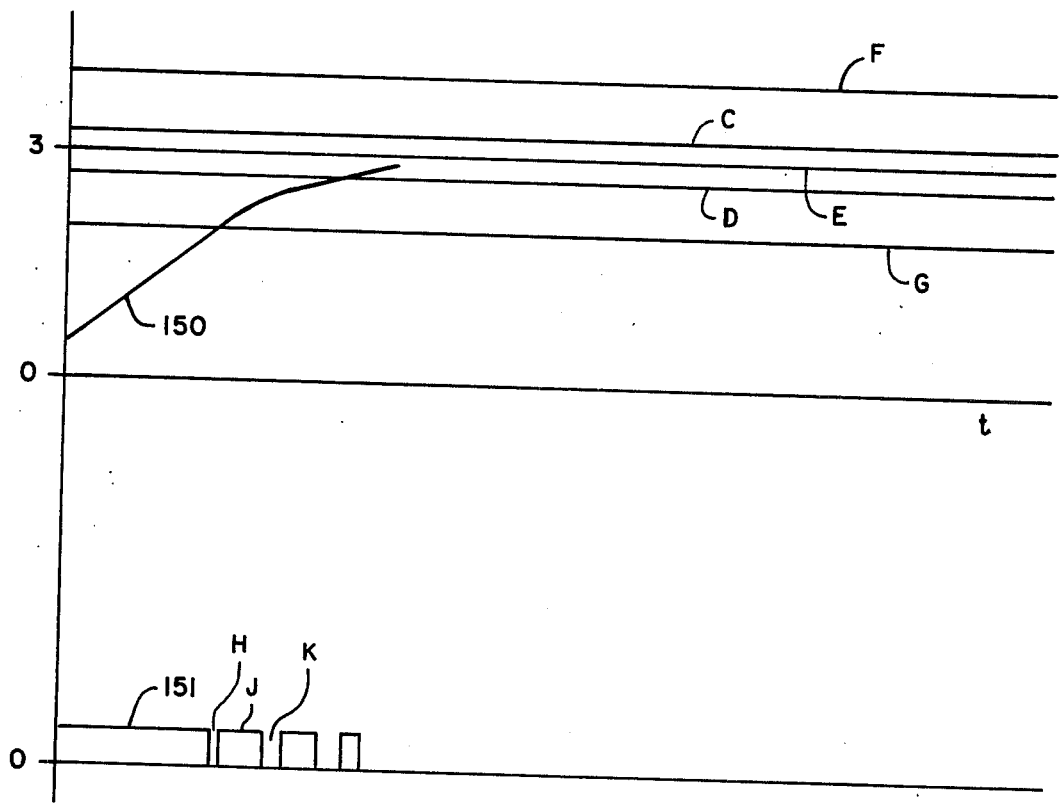

This operation is shown more fully in FIG. 4. Assuming a large instantaneous displacement, this time in the negative direction, wave form 150 shows how the error signal is reduced. Lines C and D represent the dead band as established by dead band adjustment 58. Line E represents the center of the dead band and lines F and G represent the point where solenoid windings 67 and 74 are no longer continuously energized but intermittently energized. With a large error signal such as that shown in FIG. 4, the appropriate solenoid winding 67 and 74 will be energized and, if the error signal is large enough, the solenoid winding will be continuously energized until the error signal has been sufficiently reduced to allow cyclical operation. Capacitors 80-82 will discharge to a point determined by the value of diodes 85 and 87 and resistance 83 which, if the error signal is large enough, will not be sufficient to turn off the corresponding amplifier 51 or 53. As the grader blade 14 is corrected at high speed, the error signal 150 is reduced to level G. Level G is established by the minimum charge on capacitors 80-82 at which the error signal is sufficiently reduced to allow the appropriate amplifier 51 or 53 to switch off. When this amplifier switches off as shown at H in waveform 151, capacitors 80, 81 and 82 begin to charge. But because the error signal is still rather large, only a short time passes before the voltage of point B is sufficient to allow the appropriate amplifier 51 or 53 to re-energize. When the appropriate amplifier re-energizes as shown at J in waveform 151, grader blade 14 is again moved to reduce the error signal, and capacitors 80-82 are again discharged. During this discharge cycle, however, since the error signal has been reduced, a shorter time will pass before the appropriate amplifier 51 or 53 is turned off, as shown at K in waveform 151, stopping the correction of blade 14 and allowing capacitors 80–82 to charge. If the error signal has not yet fallen into the dead band zone, capacitors 80–82 will charge to a point which will allow amplifier 51 or 53 to turn on to again be correcting the grader blade 14 and allowing capacitors 80–82 to discharge. Even a shorter time is needed to discharge capacitors 80–82 to a point where amplifiers 51 and 53 will turn off. This operational continues between lines G and D of FIG. 4 until the error signal enters the dead band zone established by lines C and D. At that point, amplifiers 51 and 53 will remain off.

As can be seen from FIG. 4, the error signal 150 is quickly reduced until it reaches line G. This operation results in a high speed operation of the grader blade 14. As the error signal 150 enters the zone established by lines G and D, the positioning speed of the grader blade 14 is gradually reduced the closer that error signal 150 comes to line D. As error signal 150 crosses line D and enters the dead band CD, correction is terminated. This operation is also shown by the wave form 151 which shows how solenoid winding 67 or 74 is energized. As error signal 150 is reduced from the point where it initially started to line G, wave form 151 shows that the appropriate amplifier is 51 or 53 is continuously energized.

As error signal 150 enters zone D–G, the appropriate amplifier will turn off for increasing lengths of time and turn on for decreasing lengths of time as the error signal is reduced. The off time increases and the on time decreases until the error signal 150 enters dead band zone C–D. At this point, both amplifier 51 and 53 are maintained off. The same operation occurs if the error signal starts from above line F shown in FIG. 4.

The embodiments of the invention in which an exclusive property or right is claimed are defined as follows:

1. A control arrangement for controlling an on-off solenoid valve of an earth working machine comprising:
   sensing means responsive to an external reference for producing an error signal;
   amplifier switching means having input means connected to said sensing means for receiving said error signal and an output means adapted to supply an output signal to the solenoid valve, said output signal being either on or off dependent upon the magnitude of said error signal; and,
   capacitor feedback means connecting said output means to said input means of said amplifier switching means for time proportioning said output signal, said output signal having on and off times dependent upon the magnitude of said error signal, said output signal being continuously on when said error is greater than a predetermined value.

2. The arrangement of claim 1 wherein said amplifier switching means comprises first and second amplifier switches.

3. The arrangement of claim 2 wherein said input means comprises a first positive input and a first negative input to said first amplifier switch and a second positive input and a second negative input to said second amplifier switch and wherein said output means comprises a first output for said first amplifier switch and a second output for said second amplifier switch.

4. The control arrangement of claim 3 wherein said amplifier switching means comprises a voltage divider.

5. The arrangement of claim 4 wherein said amplifier switching means comprises first connecting means connecting said first positive input to said sensing means, second connecting means connecting said first negative input to said voltage divider, third connecting means connecting said second positive input to said voltage divider and fourth connecting means connecting said second negative input to said sensing means.

6. The arrangement of claim 5 wherein said capacitive feedback means comprises at least one capacitor and fifth connecting means connecting said capacitor to said first output, sixth connecting means connecting said capacitor to said second output, seventh connecting means connecting said capacitor to said first positive input and eighth connecting means connecting said capacitor to said second positive input.

7. The arrangement of claim 6 wherein said first and second amplifier switches are operational amplifiers.

8. The arrangement of claim 7 wherein said voltage divider comprises at least a first resistor, a variable resistor and a second resistor wherein said first negative input is connected to the junction of said first resistor and said variable resistor and said second positive input is connected to the junction of said variable resistor and said second resistor.

9. A control arrangement for controlling an on-off solenoid valve of an earth-working machine comprising:
   sensing means responsive to an external reference for producing an error signal;
   first and second amplifier switches having respective positive and negative inputs, said positive input of said first amplifier switch and said negative input of said negative amplifier switch connected to said sensing means for receiving said error signal, said first and second amplifier switches having corresponding first and second outputs adapted to supply first and second output signals to corresponding first and second windings of the solenoid valve, said first and second output signals being either on or off dependent upon the magnitude of said error signal;
   voltage divider means having dead band means, said negative input of said first amplifier switch and said positive input of said second amplifier switch being connected across the dead band means, said dead band means establishing a dead band wherein neither amplifier is on when the error signal has a magnitude falling within the dead band; and,
   capacitive feedback means connected to said first and second outputs and to one of said positive and negative inputs of both of said amplifier switches for time-proportioning said output signals, said output signals having on and off times dependent upon the deviation of said error signal from said dead band, said output signal being continuously on when said error is greater than a predetermined value.

10. The arrangement of claim 9 wherein said capacitive feedback means comprises at least one capacitor and first resistor means connecting said capacitor to said positive input of said first amplifier switch and second resistor means connecting said capacitor to said positive input of said second amplifier switch.

11. The arrangement of claim 10 wherein said capacitive feedback means comprises third resistor means connecting said capacitor to said first output and fourth resistor means connecting said capacitor to said second output.

12. The arrangement of claim 11 wherein said amplifier switches are operational amplifiers.

13. The control arrangement of claim 12 wherein said voltage divider comprises a series arrangement of a first resistor, an adjustable dead band resistor and a second resistor, said negative input of said first amplifier switch being connected to the junction of said first resistor and said adjustable dead band resistor and said positive input of said second amplifier switch being connected to the junction of said adjustable dead band resistor and said second resistor.

* * * * *